(12) United States Patent
Gabe et al.

(10) Patent No.: US 8,037,676 B2
(45) Date of Patent: Oct. 18, 2011

(54) REGENERATION CONTROL METHOD FOR EXHAUST GAS PURIFICATION SYSTEM, AND EXHAUST GAS PURIFICATION SYSTEM

(75) Inventors: Masashi Gabe, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 576 days.

(21) Appl. No.: 12/084,131

(22) PCT Filed: Sep. 20, 2006

(86) PCT No.: PCT/JP2006/318561
§ 371 (c)(1),
(2), (4) Date: Apr. 25, 2008

(87) PCT Pub. No.: WO2007/058015
PCT Pub. Date: May 24, 2005

(65) Prior Publication Data
US 2009/0126347 A1 May 21, 2009

(30) Foreign Application Priority Data
Nov. 21, 2005 (JP) .................................. 2005-335767

(51) Int. Cl.
*F01N 3/00* (2006.01)
(52) U.S. Cl. ................ 60/295; 60/274; 60/286; 60/287; 60/292; 60/303; 60/324
(58) Field of Classification Search .................. 60/274, 60/280, 285, 286, 287, 292, 295, 297, 303
See application file for complete search history.

(56) References Cited

U.S. PATENT DOCUMENTS

| | | | |
|---|---|---|---|
| 5,473,890 A | 12/1995 | Takeshima et al. | |
| 6,101,809 A | 8/2000 | Ishizuka et al. | |
| 6,173,568 B1 * | 1/2001 | Zurbig et al. | 60/274 |
| 6,212,885 B1 * | 4/2001 | Hirota et al. | 60/288 |
| 6,615,580 B1 * | 9/2003 | Khair et al. | 60/286 |
| 6,779,339 B1 * | 8/2004 | Laroo et al. | 60/297 |
| 7,117,667 B2 * | 10/2006 | Mital et al. | 60/286 |

(Continued)

FOREIGN PATENT DOCUMENTS

CN 1610790 A 4/2005

(Continued)

OTHER PUBLICATIONS

Chinese Office Action issued Aug. 14, 2009 in corresponding Chinese Patent Application 2006800435878.

(Continued)

*Primary Examiner* — Binh Q Tran
(74) *Attorney, Agent, or Firm* — Staas & Halsey LLP (57) ABSTRACT

An exhaust gas purification system including a reducing agent supplying apparatus and an exhaust gas purification apparatus, in that order from an upstream side of an exhaust passage in an internal combustion engine, and a control unit for controlling an amount of reducing agent supplied into the exhaust gas to recover purification capability of the exhaust gas purification apparatus. A concentration of the reducing agent in the exhaust gas, which flows into the exhaust gas purification apparatus, is varied temporally. The reducing agent is supplied in a proper amount to efficiently recover the purification capability. At the same time, the outflow of the reducing agent to the downstream side of the exhaust gas purification apparatus can be prevented.

6 Claims, 6 Drawing Sheets

U.S. PATENT DOCUMENTS

| | | | |
|---|---|---|---|
| 7,334,400 B2 * | 2/2008 | Yan et al. | 60/286 |
| 7,571,602 B2 * | 8/2009 | Koch | 60/286 |
| 2003/0101713 A1 | 6/2003 | Dalla Betta et al. | |
| 2005/0109021 A1 | 5/2005 | Noirot et al. | |

FOREIGN PATENT DOCUMENTS

| | | |
|---|---|---|
| EP | 1533490 | 11/2006 |
| FR | 2847939 | 6/2004 |
| JP | 6-229232 | 8/1994 |
| JP | 11-62666 | 3/1999 |
| JP | 2000-352308 | 12/2000 |
| JP | 2001-020781 | 1/2001 |
| JP | 2002-021540 | 1/2002 |
| JP | 2002-097940 | 4/2002 |
| JP | 2002-349249 | 12/2002 |
| JP | 2003-013730 | 1/2003 |
| JP | 2003-269155 | 9/2003 |
| JP | 2004-346798 | 12/2004 |
| WO | 03/048536 A1 | 6/2003 |

OTHER PUBLICATIONS

Patent Abstracts of Japan, Publication No. 2003-269155, Published Sep. 25, 2003.

Patent Abstracts of Japan, Publication No. 2004-346798, Published Dec. 9, 2004.

International Search Report for corresponding International Patent Application PCT/JP2006/318561 filed on Sep. 20, 2006.

Extended European Search Report dated Oct. 14, 2010 for Application No. 06810292.0.

Patent Abstracts of Japan, Publication No. 11-62666, Published Mar. 5, 1999.

Japanese Office Action dated Feb. 11, 2011 in Application No. 2005-335767.

* cited by examiner

REGENERATION CONTROL METHOD FOR EXHAUST GAS PURIFICATION SYSTEM, AND EXHAUST GAS PURIFICATION SYSTEM

CROSS REFERENCE TO RELATED APPLICATIONS

This application claims the benefit under 35 U.S.C. Section 371, of PCT International Application Number PCT/JP2006/318561, filed Sep. 20, 2006, published as WO2007/058015 on May 24, 2007, which claimed priority to Japanese Application No. 2005-335767, filed Nov. 21, 2005 in Japan, the contents of which are incorporated herein by reference.

BACKGROUND OF THE INVENTION

1. Field of the Invention

The present invention relates to a regeneration control method for an exhaust gas purification system and an exhaust gas purification system equipped with an exhaust gas purification apparatus that purifies the exhaust gas in an exhaust passage in an internal combustion engine.

2. Background Art

Exhaust gas control for automobiles has increased in strictness, and a situation is coming in which it cannot be pursued only by the technical development of the engine side. It has become necessary and indispensable to purify the exhaust gas with a post process apparatus. Because of that, various researches and proposals have been made on a NOx catalyst to reduce and remove NOx (a nitrogen oxide) from the exhaust gas of an internal combustion engine such as a diesel engine and a part of gasoline engine and various combustion apparatuses, and on a diesel particulate filter apparatus (below, a DPF apparatus) that removes particle-shaped substances (Particulate Matter: below, PM) in the exhaust gas of these.

In these researches and proposals, a NOx occlusion reduction type catalyst, a NOx direct reduction type catalyst, etc. are proposed as the NOx purification catalyst.

A NOx occlusion reduction type catalyst apparatus carrying a NOx occlusion reduction type catalyst is configured by carrying a noble metal catalyst having an oxidation function and a NOx occlusion material having a NOx occlusion function such as an alkaline metal, and with these, two functions of NOx occlusion and NOx discharging and purification are exhibited depending on the oxygen concentration in the exhaust gas.

That is, in the case that the air fuel ratio of the exhaust gas flowing into the NOx occlusion reduction type catalyst apparatus has a lean state, nitrogen monoxide in the exhaust gas becomes nitrogen dioxide by being oxidized by the noble metal catalysts, and this nitrogen dioxide is occluded by a NOx occlusion material as a nitrate. On the other hand, in the case of the air fuel ratio of the exhaust gas having a rich state, $NO_2$ is discharged by a nitrate being decomposed from the NOx occlusion material, and this $NO_2$ is reduced to nitrogen by non-combusted hydrocarbon and carbon monoxide in the exhaust gas due to a catalyst action of the noble metal catalysts. Because of that, when the NOx occlusion ability of the NOx occlusion material comes closer to saturation, the NOx recovery control for recovering NOx occlusion ability is performed to make the air fuel ratio in the exhaust gas a rich state.

Further, a NOx direct reduction type catalyst apparatus carrying a NOx direct reduction type catalyst is configured by carrying a metal such as rhodium and palladium, that is a catalyst component, in a carrier such as a β type zeorite, and directly reduces NOx. Then, oxygen is absorbed into the metal that is an active substance of the catalyst at this reduction, and NOx reduction performance deteriorates. Therefore, in order to recover the NOx reduction performance, the air fuel ratio of the exhaust gas is made to be a rich state, a NOx regeneration control action for recovering the NOx reduction performance is performed, and activation is performed by regenerating the active substance of the catalyst.

In these exhaust gas purification systems equipped with a NOx purification catalyst apparatus, the NOx regeneration control that performs this air fuel ratio rich control is normally controlled to start automatically when a certain condition of NOx occlusion amount, NOx purification rate, lean continuing time, etc. reaches a threshold set in advance.

Then, combustion in a normal operation condition that is not under NOx regeneration control is in an air fuel ratio lean state of excess oxygen condition. Therefore, in order to obtain an air fuel ratio rich state with this NOx regeneration control, it is necessary to decrease the intake amount, increase the fuel amount, or perform both, that is to perform any of these air fuel ratio rich controls for regenerating NOx.

In the intake rich control that decreases the intake amount, there is a method such as increasing the EGR amount, exhaust throttle, and intake throttle. Further, in the fuel rich control that increases the fuel amount, there is a method such as post injection in injection in a cylinder (in a cylinder) and direct injection in an exhaust pipe in which fuel such as light oil is injected directly into the exhaust pipe and supplies a reducing agent such as HC and CO into the exhaust gas flowing into a NOx purification catalyst apparatus.

This direct injection in the exhaust pipe has an advantage that it does not influence the engine operation condition compared with the post injection. An exhaust purification apparatus of an internal combustion engine and an exhaust purification system of an internal combustion engine using this direct injection in the exhaust pipe are proposed in Japanese Patent Application Kokai Publication No. 2003-269155 and Japanese Patent Application Kokai Publication No. 2004-346798 for example.

However, in the direct injection in the exhaust pipe in which the air fuel ratio lean state is switched to an air fuel ratio rich state during NOx regenerating control action, in the case of performing a fixed amount injection, an objective supply amount is not reached instantly due to the characteristic of the reducing agent injection apparatus even when the reducing agent is started to be injected from the reducing agent injection apparatus into the exhaust pipe. That is, a delay in response time occurs. Because of that, as shown in FIG. 4, the air fuel ratio condition (air excess rate $\lambda$) in the exhaust gas cannot be made to be a rich state instantly and it becomes a gentle transition as shown in FIG. 4A.

As a result, because oxygen exists in the exhaust gas at the initial stage of the regeneration control, the supplied reducing agent is oxidized by a catalytic action of the catalyst metal of the NOx occlusion reduction type catalyst and consumed. As a result, NOx discharged from the NOx occlusion reduction type catalyst cannot be reduced sufficiently.

Figure 4:
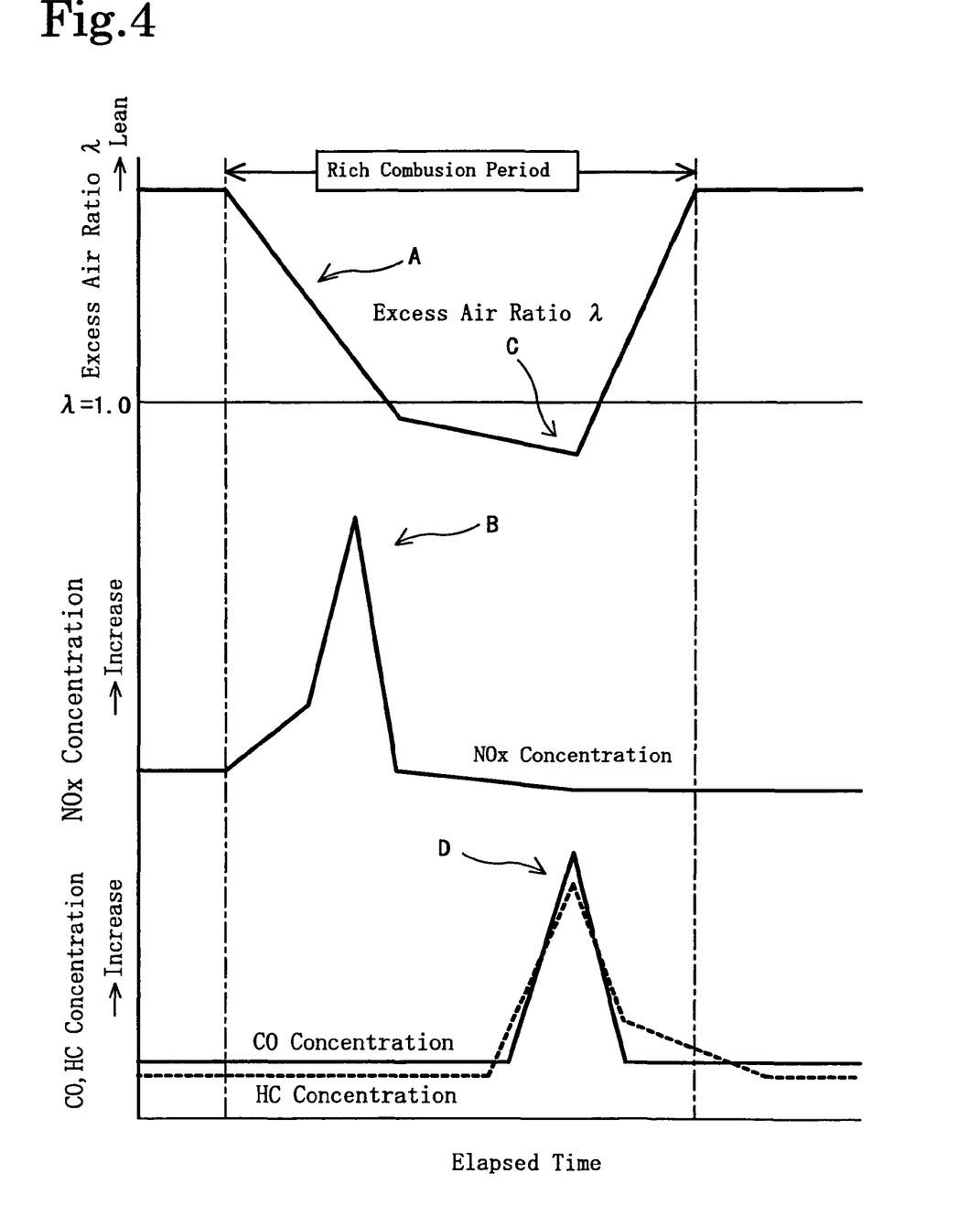
FIG. 4 is a drawing schematically showing a temporal change of excess air ratio flowing into the exhaust gas purification apparatus and the NOx concentration, the HC concentration, and the CO concentration in the exhaust gas flowing out during NOx regeneration control according to the conventional art.

Then, because the discharge amount of NOx during NOx regeneration is large at the beginning of the regeneration, a large amount of NOx is discharged (slipped) in the downstream side of the NOx occlusion reduction type catalyst apparatus, even if it is temporary, as shown in FIG. 4B, and there is a problem that the NOx purification performance deteriorates. Further, because the consumption amount of the supplied reducing agent becomes less, heat generation due to the oxidation of the reducing agent becomes insufficient, the increase of temperature of the NOx occlusion reduction type catalyst becomes slow, and a problem also occurs in which activation of the catalyst delays.

Further, after that, the reducing agent amount becomes large and the condition becomes deeply rich as shown in FIG. 4C, and the reducing agent corresponding to NOx that is not reduced is supplied into the exhaust gas after the discharge of NOx is completed as well. Because of that, as shown in FIG. 4D, the reducing agent flows out to the downstream side of the NOx occlusion reduction type catalyst apparatus, and a problem of HC and CO slip occurs. Further, because the reducing agent that does not contribute to the reduction of NOx is supplied, deterioration of fuel economy is invited.

This problem of the reducing agent supply occurs not only in an exhaust gas purification system of an independent NOx occlusion reduction type catalyst apparatus, but also in an exhaust gas purification system in which an oxidation catalyst is arranged in the upstream side of the NOx occlusion reduction type catalyst apparatus, etc.

The present inventors obtained knowledge as follows as a result of performing experiments, simulated calculation, etc. based on these results.

Figure 3:
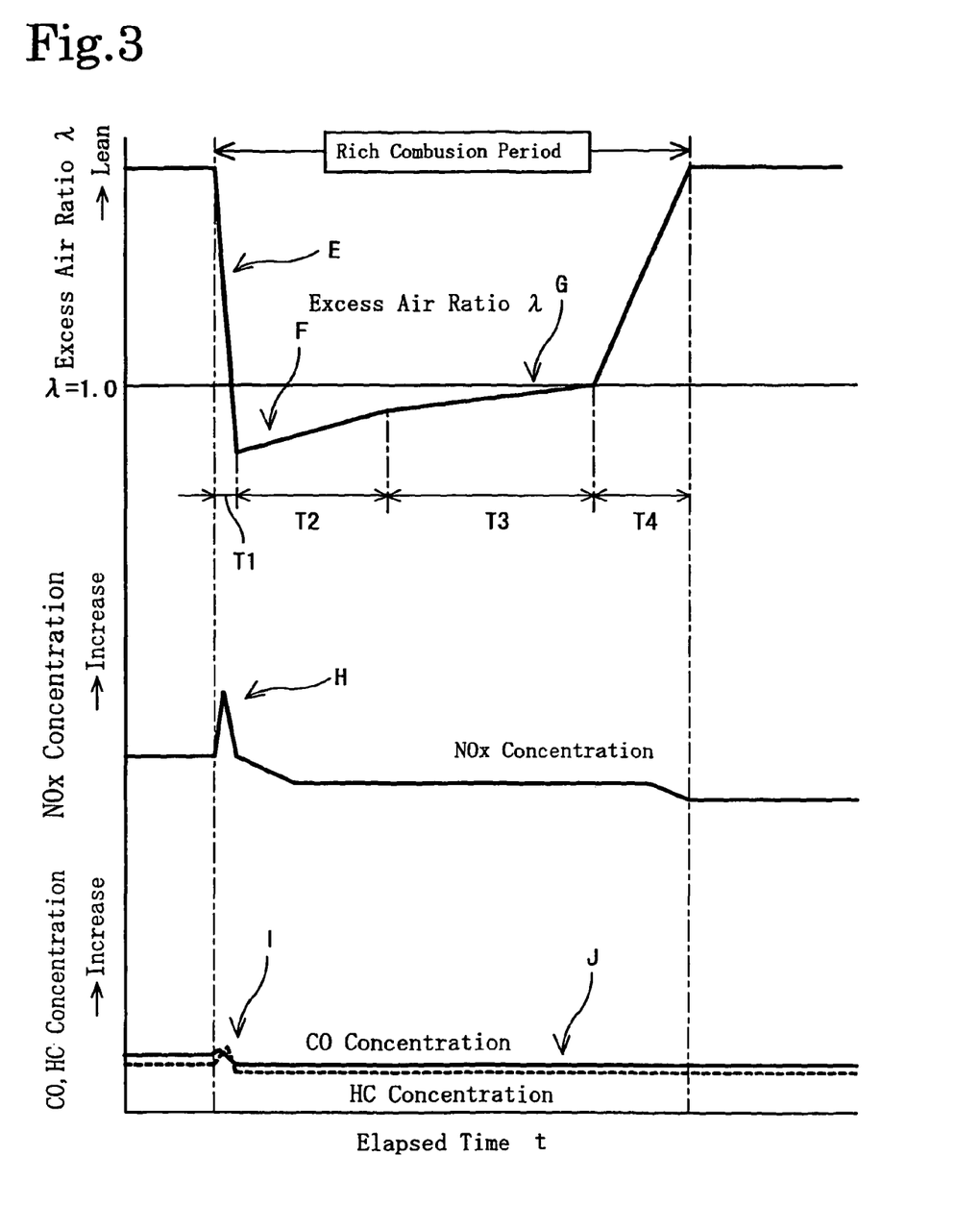
FIG. 3 is a drawing schematically showing a temporal change of excess air ratio flowing into the exhaust gas purification apparatus and the NOx concentration, the HC concentration, and the CO concentration in the exhaust gas flowing out during NOx regeneration control according to the present invention.

During NOx regeneration, as shown in FIG. 3, the concentration of the reducing agent in the exhaust gas flowing into the NOx occlusion reduction type catalyst apparatus is rapidly made to be a high concentration (E, F) of about 0.70 to 0.90 in excess air ratio conversion at the beginning of the regeneration, and after that, it is made to a low concentration (G) of about 0.80 to 1.00 in excess air ratio conversion. With this, the peak of the NOx concentration in a downstream side of the NOx occlusion reduction type catalyst apparatus at the beginning of the regeneration can be made small as shown as H in FIG. 3. Further, a peak (J) of the HC concentration and the CO concentration in the downstream side of the NOx occlusion reduction type catalyst apparatus right before completion can be eliminated even if there is a small peak (I) at the beginning of the regeneration.

On the other hand, an exhaust gas purification system equipped with a catalyst carrying DPF apparatus (CSF) in which a NOx occlusion reduction type catalyst is carried in a DPF apparatus that collects PM in the exhaust gas and a NOx occlusion reduction type catalyst apparatus in its downstream side is proposed.

In this exhaust gas purification system, in order to avoid excessive clogging up of the DPF, a PM regeneration control action is performed when the sediment amount of the collected PM exceeds a prescribed judgment value. In this PM regeneration control, in the case that the temperature of the exhaust gas flowing into the catalyst carrying DPF apparatus is low, the carried catalyst is activated by increasing the temperature and a reducing agent such as a fuel is supplied into the exhaust gas from a reducing agent injection apparatus. The PM is removed by combustion by oxidizing this reducing agent with a catalytic reaction of the carried catalysts and by increasing the temperature of the catalyst carrying DPF apparatus to an initial temperature of PM combustion or more with this oxidization heat.

In order to perform re-combustion of PM in the current system, first the temperature of the supplied exhaust gas is increased to an activation temperature of the oxidization catalysts arranged in a front step (the upstream side) with an after injection (a post injection), etc., and then the temperature of the exhaust gas is increased to the PM re-combustion temperature of about 600° C. With this, PM is combusted.

In this case, there is a problem that deterioration of fuel economy is large because the temperature of the entire amount of the exhaust gas supplied to the catalyst is increased to 600° C. Further, because the PM combustion is local combustion, in the case that the average temperature of the exhaust gas is as high as 600° C., the local temperature reaches to about 800° C., and there is a problem that early deterioration of the carried catalyst is caused.

Then, because frequent PM regeneration as described above causes extreme deterioration of fuel economy, PM regeneration combustion is performed after accumulating a considerable amount of PM in a filter. Because of that, the local temperature becomes higher, and there is a problem that the exhaust pressure increases due to the accumulation of PM and further deterioration of fuel economy is caused.

For this DPF apparatus, the present inventors performed experiments, simulation calculation, etc. As a result, knowledge was obtained in which the said problem can be solved by performing the following PM regeneration when a small amount of PM is accumulated at the initial stage of the PM accumulation without increasing the temperature of the entire amount of the exhaust gas that becomes a cause of the deterioration of fuel economy in the case of performing the PM regeneration control without arranging the oxidization catalyst in the front step of the filter.

Figure 6:
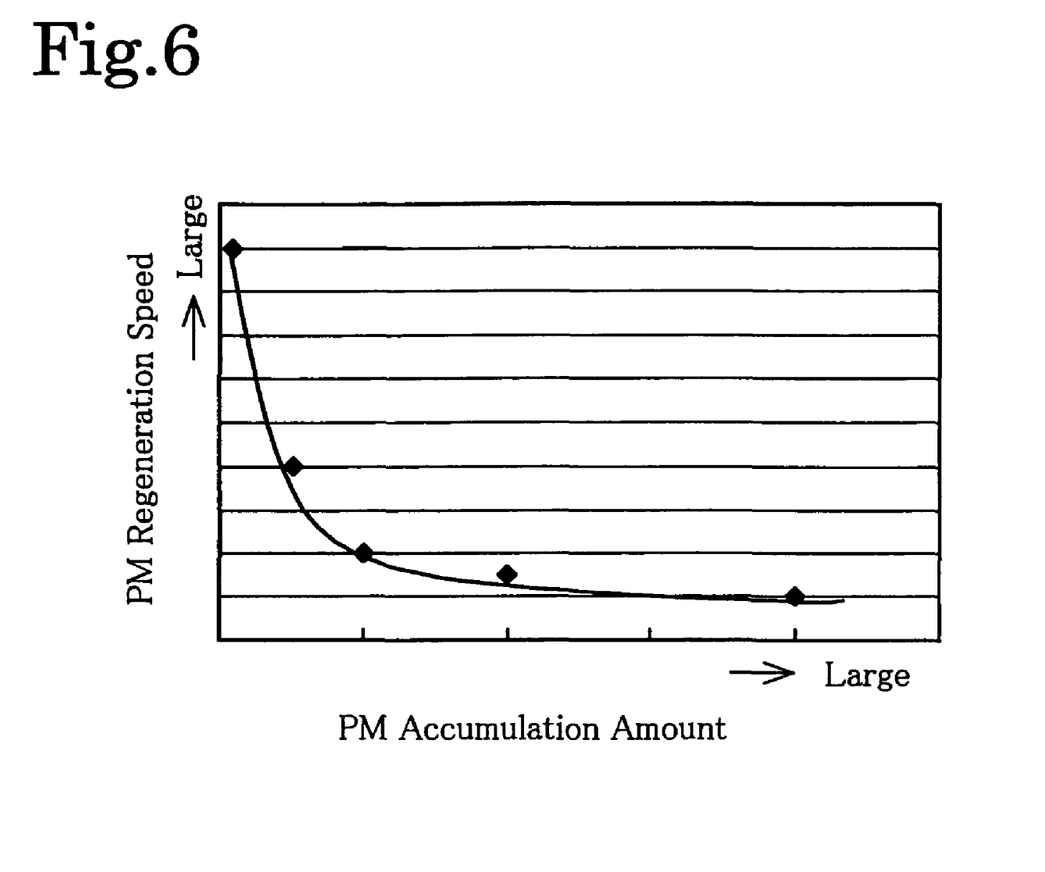
FIG. 6 is a drawing showing the relationship of the PM accumulation amount and the PM regeneration speed.

In the PM regeneration control, as shown in FIG. 6, the smaller the PM accumulation amount, the larger the PM regeneration speed is. That is, in the PM combustion, the smaller the PM accumulation amount is, the more the combustion speed increases and PM disappears in a short time, and on the contrary, the combustion speed decreases extremely as the PM accumulation amount becomes large, and the combustion becomes difficult. Because of that, the PM regeneration is performed on a small amount of the PM accumulation at the initial stage of the PM accumulation. For example, the PM regeneration control is preferably performed once every 5 to 6 times that the NOx regeneration is performed.

Therefore, in this PM regeneration control, deterioration of the fuel economy is small because the temperature of the entire amount of the exhaust gas is not increased, and deterioration of the fuel economy can be prevented because the PM regeneration is performed at the initial stage where an increase of the exhaust pressure due to the PM accumulation is small.

Then, in this PM regeneration control, fuel is directly added in the exhaust gas, and HC, that is a reducing agent, is supplied in the catalyst carrying DPF apparatus (CSF). In this case, the beginning of the PM regeneration control is made to be a lean state in which the amount of fuel is relatively small as being 1.5 to 5.0 in excess air ratio conversion. After that, it is made to be a rich state of 1.0 to 0.9 in excess air ratio conversion. After that, it is again made to be a lean state in which the amount of fuel is relatively small as being 1.5 to 5.0 in excess air ratio conversion. With this, HC and CO can be purified while preventing discharge of NOx also during the PM regeneration, and quick combustion of PM can be completed without excessively increasing the temperature of the exhaust gas. Therefore, it was found that deterioration of fuel economy and deterioration of the catalyst can be prevented.

When HC is absorbed on the surface of the oxidization catalyst of the catalyst carrying DPF apparatus in this initial lean state, there is sufficient oxygen, and therefore a small amount of the accumulated PM can be ignited and combusted. With this ignition, the temperature is increased locally only on the surface of the oxidization catalyst. With this increase of the temperature, $NO_2$ that has been occluded to the catalyst is discharged. PM is combusted with this $NO_2$, and $NO_2$ becomes NO. Discharge of this discharged NO into the atmosphere is prevented by being occluded by the NOx occlusion reduction type catalyst in the downstream side.

With the rich state in which the fuel is supplied densely after that, the NO occluded to the NOx occlusion reduction type catalyst arranged in the downstream side is discharged, and at the same time, the reduction and purification is performed with the oxidation catalyst. HC and CO that are not used (excess) in this reduction are oxidized and purified or absorbed and purified with a three-dimensional catalyst or the oxidation catalyst in the downstream side of the NOx occlusion reduction type catalyst. Further, NOx (slipped NOx) flowing out in the downstream side of the NOx occlusion reduction type catalyst is also purified at the same time. Then, higher HC and CO purification activity can be obtained by making a lean state in which fuel is relatively small again.

However, in the conventional art, it is not performed that the concentration of the reducing agent in the exhaust gas flowing into the exhaust gas purification apparatus is changed with time so as to correspond to the temporal change of the condition of the exhaust gas purification apparatus during regeneration when the reducing agent is supplied at the regeneration of the exhaust gas purification apparatus. Because of that, it is desired to perform a proper control action.

Patent Document 1: Japanese Patent Application Kokai publication No. 2003-269155

Patent Document 2: Japanese Patent Application Kokai publication No. 2004-346798

SUMMARY OF THE INVENTION

The present invention is performed to solve the above-described problems by obtaining the above-described knowledge, and its objective is to provide a regeneration control method for an exhaust gas purification system, and an exhaust gas purification system in which the regeneration corresponding to a temporal change of the condition of the exhaust gas purification apparatus during regeneration can be performed, in which the purification capability can be recovered effectively by supplying a reducing agent to the exhaust gas purification apparatus at an appropriate amount, and in which the reducing agent can be prevented from flowing out to the downstream side of the exhaust gas purification apparatus, in regeneration control to recover the purification capability of the exhaust gas purification apparatus.

The regeneration control method for an exhaust gas purification system to achieve the objective as described above, arranging an exhaust gas purification apparatus in an exhaust passage in an internal combustion engine, providing a reducing agent supplying apparatus that supplies the reducing agent into the exhaust gas in the upstream side of the said exhaust gas purification apparatus, and at the same time, equipped with a control unit that performs a reducing agent supply control supplying the reducing agent from the said reducing agent supplying apparatus in the exhaust gas flowing into the said exhaust gas purification apparatus during regeneration to recover the purification capability of the said exhaust gas purification apparatus, is characterized in that the concentration of the reducing agent in the exhaust gas flowing into the said exhaust gas purification apparatus is changed with time so as to correspond to the temporal change of the condition of the exhaust gas purification apparatus during regeneration when the reducing agent is supplied during regeneration of the said exhaust gas purification apparatus.

With this method, during regeneration to recover the purification capability of the exhaust gas purification apparatus, the concentration of the reducing agent in the exhaust gas can be supplied at an appropriate amount from beginning to end, and the purification capability can be recovered effectively. Further, the reducing agent can be prevented from flowing out to the downstream of the exhaust gas purification apparatus.

Then, the said regeneration control method for the exhaust gas purification system is characterized in that the said exhaust gas purification apparatus is an exhaust gas purification apparatus carrying a NOx occlusion reduction type catalyst and that when the reducing agent is supplied at the NOx regeneration of the exhaust gas purification apparatus, the concentration of the reducing agent in the exhaust gas flowing into the said exhaust gas purification apparatus is made to be a high concentration of 0.70 to 0.80 in excess air ratio conversion during 0.01 s to 0.50 s at the beginning of the regeneration, a high concentration of 0.70 to 0.90 in excess air ratio conversion is kept for a prescribed time, then a low concentration of 0.80 to 1.00 in excess air ratio conversion is kept for a prescribed time, and then the supply of the reducing agent is stopped.

In the case that the exhaust gas purification apparatus is a NOx occlusion reduction type catalyst apparatus, because the discharge amount of NOx is large at the beginning of the regeneration and there is a necessity to consume the absorbed $O_2$ on the surface of the catalyst when the air fuel ratio is controlled to be rich in the NOx regeneration, there is a necessity of this $O_2$ consumption and of consuming and reducing the discharged NOx rapidly, and there is a necessity of making at the beginning of the regeneration in high concentration rapidly. On the other hand, because the NOx discharge amount becomes less and becomes about a constant amount after that, there is a necessity to make it in low concentration.

This "rapidly" is that a period of the NOx regeneration control of about 2 s (second) to 5 s per one time for example. Instantly, the highest concentration of 0.70 to 0.8 in excess air ratio conversion is achieved in about 0.01 s to 0.50 s for example. This highest concentration and the high concentration of 0.70 to 0.90 (more preferably in the range of 0.75 to 0.85) in excess air ratio conversion) are kept for about 0.10 s to 2.5 s. After that, the low concentration of 0.80 to 1.00 (more preferably in the range of 0.90 to 1.00) in excess air ratio conversion is kept for about 0.20 s to 4.0 s, and then the supply of the reducing agent is stopped.

Further, when a preferred example is referred to with the ratio of the regeneration control period, the highest concentration is achieved during 1% to 5% of the regeneration control period, the high concentration maintaining period is 20% to 40% of the regeneration control period, the low concentration maintaining period is 40% to 60% of the regeneration control period, and the period of returning to a lean state from the low concentration is the remainder of the regeneration control period (15% to 40%).

Temporal change of the reducing agent concentration in this exhaust gas can be carried out by performing a control to change the injection amount with a duty control, etc. in each period of the regeneration control using a fuel adding valve with a large capacity in the reducing agent supplying apparatus for example.

Then, the regeneration control method for an exhaust gas purification system is characterized in that the said exhaust gas purification apparatus is equipped with a catalyst carrying DPF apparatus that carries a NOx occlusion reduction type catalyst and a NOx occlusion reduction type catalyst apparatus arranged in the downstream side of the catalyst carrying DPF apparatus, and that when the reducing agent is supplied during PM regeneration of the exhaust gas purification apparatus, the concentration of the reducing agent in the exhaust gas flowing into the said exhaust gas purification apparatus is made to be a low concentration of 1.5 to 5.0 in excess air ratio conversion during a prescribed period at the beginning of the regeneration, a high concentration of 0.90 to 1.00 in excess air ratio conversion is kept for a prescribed time, then a low concentration of 1.5 to 5.0 in excess air ratio conversion is kept for a prescribed time, and then the supply of the reducing agent is stopped.

In this regeneration, the period of the PM regeneration control per one time is about 10 s to 240 s (normally, 2 to 3 min) for example. A low concentration of 1.5 to 5.0 (more preferable range is 1.10 to 2.0) in excess air ratio conversion is made during about 1.0 s to 60.0 s at the beginning of the regeneration. This low concentration is kept for about 3.0 s to 60.0 s. After that, a high concentration of 0.90 to 1.00 (a more preferable range is 0.95 to 1.00) in excess air ratio conversion is kept for about 3.0 s to 60.0 s. Furthermore, a low concentration of 5.0 to 1.5 in excess air ratio conversion is kept for about 3.0 s to 60.0 s, and then the supply of the reducing agent is stopped.

Further, when a preferred example is referred to with the ratio of the regeneration control period, a low concentration is made during 10% to 25% of the regeneration control period. Further, the low concentration maintaining period at the beginning of the regeneration is 30% to 50% of the regeneration control period, the high concentration maintaining period is 30% to 50% of the regeneration control period, and the low concentration maintaining period just before regeneration completion is the remainder of the regeneration control period (15% to 30%).

With this method, the concentration of the reducing agent in the exhaust gas can be supplied at an appropriate amount from beginning to end, and the purification capability can be recovered effectively, and further the reducing agent can be prevented from flowing out to the downstream side of the exhaust gas purification apparatus.

Further, in the case that it is difficult to use the fuel adding valve that can carry out a change of the injection amount within a short time as the reducing agent supplying apparatus, a fuel adding valve such as constant injection is used. With this, the concentration of the reducing agent in the exhaust gas flowing into the said exhaust gas purification apparatus can be made to be a high concentration rapidly at the beginning of the regeneration, and after that can be made to be a low concentration in the exhaust gas purification system described below.

The regeneration control method of this exhaust gas purification system arranging the exhaust gas purification apparatus in the exhaust passage of the internal combustion engine, providing the reducing agent supplying apparatus in the upstream side of the said exhaust gas purification apparatus, and equipped with a control unit that performs a reducing agent supply control that supplies the reducing agent from the said reducing agent supplying apparatus into the exhaust gas flowing into the said exhaust gas purification apparatus during regeneration control to recover purification capability of the said exhaust gas purification apparatus, is characterized in that a first branched exhaust passage and a second branched exhaust passage are provided by branching the said exhaust passage in the upstream side of the said exhaust gas purification apparatus and merging in the upstream side of the said exhaust gas purification apparatus, the said reducing agent supplying apparatus is arranged in the said first branched exhaust passage, and at the same time, a flow path control means is provided that controls the flow of the exhaust gas in the said first branched exhaust passage, that the said exhaust gas purification apparatus carries a NOx occlusion reduction type catalyst, and that the flow of the exhaust gas in the said first branched exhaust passage is stopped with the said flow path control means, the reducing agent is supplied from the said reducing agent supplying apparatus into the exhaust gas in the said first branched exhaust passage, and then the exhaust gas in the said first branched exhaust passage is flowed with the said flow path control means while maintaining the supply of this reducing agent, and at the same time, the flow of the exhaust gas in the said second branched exhaust passage is stopped, and then the supply of the reducing agent is performed for a prescribed time and then stopped, during the supply of the reducing agent during NOx regeneration of the NOx occlusion reduction type catalyst.

Or, this exhaust gas purification system arranging the exhaust gas purification apparatus in the exhaust passage of the internal combustion engine, providing the reducing agent supplying apparatus in the upstream side of the said exhaust gas purification apparatus, and equipped with a control unit that performs a reducing agent supply control that supplies the reducing agent from the said reducing agent supplying apparatus into the exhaust gas flowing into the said exhaust gas purification apparatus during regeneration control to recover purification capability of the said exhaust gas purification apparatus, is characterized in that a first branched exhaust passage and a second branched exhaust passage are provided by branching the said exhaust passage in the upstream side of the said exhaust gas purification apparatus and merging in the upstream side of the said exhaust gas purification apparatus, the said reducing agent supplying apparatus is arranged in the said first branched exhaust passage, and at the same time, a flow path control means is provided that controls the flow of the exhaust gas in the said first branched exhaust passage, that the said exhaust gas purification apparatus carries a NOx occlusion reduction type catalyst, and that the said control unit stops the flow of the exhaust gas in the said first branched exhaust passage with the said flow path control means, the reducing agent is supplied from the said reducing agent supplying apparatus into the exhaust gas in the said first branched exhaust passage, and then the exhaust gas in the said first branched exhaust passage is flowed with the said flow path control means while maintaining the supply of this reducing agent, and at the same time, the flow of the exhaust gas in the said second branched exhaust passage is stopped, and then the supply of the reducing agent is performed for a prescribed time and then stopped, during the supply of the reducing agent during NOx regeneration of the said NOx occlusion reduction type catalyst.

According to this regeneration control method for the exhaust gas purification system and the exhaust gas purification system, the flow of the exhaust gas is made to be in the second branched exhaust passage side during regeneration, and the reducing agent is supplied into the exhaust gas retaining in the first branched exhaust passage at the state in which the flow of the exhaust gas in the first branched exhaust passage is stopped. Because of that, even in the case of using the fuel adding valve in which an amount of the reducing agent that is supplied gradually increases from the start of the injection, the concentration of the reducing agent of the exhaust gas in the tip side retained in the first branched exhaust passage becomes high, and then the concentration of the reducing agent of the exhaust gas at the rear side becomes low.

Because of that, when the flow of the exhaust gas in the first branched exhaust passage is restored after that, the exhaust gas with high concentration flows into the NOx occlusion reduction type catalyst apparatus at first, and after that, the exhaust gas with low concentration flows into the NOx occlusion reduction type catalyst apparatus.

Therefore, by providing the second branched passage and the flow path control means, the concentration of the reducing agent in the exhaust gas flowing into the NOx occlusion reduction type catalyst apparatus is rapidly made to be high concentration at the beginning of the regeneration, and after that, it can be made to be low concentration at the NOx regeneration of the exhaust gas purification apparatus even in the case of using a fuel adding valve with a slow response property.

Then, when the reducing agent is supplied at the NOx regeneration of the NOx occlusion reduction type catalyst, the concentration of the reducing agent in the exhaust gas flowing into the exhaust gas purification apparatus is made to be a high concentration of 0.70 to 0.80 in excess air ratio conversion during 0.01 s to 0.50 s at the beginning of the regeneration, and a high concentration of 0.70 to 0.90 in excess air ratio conversion is kept for a prescribed time. Then a low concentration of 0.80 to 1.00 in excess air ratio conversion is kept for a prescribed time, and after that the supply of the reducing agent is stopped. This is preferable. With this, the reducing agent can be supplied at an appropriate amount from beginning to end, and the concentration of the reducing agent in the exhaust gas can be optimally maintained. Because of that, the purification capability can be recovered effectively and further the reducing agent can be prevented from flowing out to the downstream side of the exhaust gas purification apparatus.

Then, it can be applied to the case that the exhaust gas purification apparatus is made by having a catalyst carrying DPF apparatus carrying a NOx occlusion reduction type catalyst, a NOx occlusion reduction type catalyst apparatus, and a catalyst apparatus carrying an oxidizing catalyst or a three dimensional catalyst from the upstream side, and a large effect can be exhibited.

According to the regeneration control method for an exhaust gas purification system and the exhaust gas purification system affecting the present invention, because the regeneration control to recover the purification capability of the exhaust gas purification apparatus can be performed in which a temporal change of a mechanism of the regeneration and of the sate of the exhaust gas purification apparatus during regeneration is considered by changing the concentration of the reducing agent of the exhaust gas flowing into the exhaust gas purification apparatus with time, the purification capability can be recovered effectively and the reducing agent can be prevented from flowing out to the downstream of the exhaust gas purification apparatus.

DESCRIPTION OF EMBODIMENTS

Below, the regeneration control method for an exhaust gas purification system and the exhaust gas purification system in the embodiment according to the present invention is explained by exemplifying a DPF apparatus carrying a NOx occlusion reduction type catalyst and an exhaust gas purification apparatus having the NOx occlusion reduction type catalyst apparatus and by referring to Figures.

Moreover, the rich state of the exhaust gas referred to here is the condition in which the ratio of an air amount and a fuel amount supplied in the exhaust gas flowing into the exhaust gas purification apparatus is a condition close to a theoretical air fuel ratio (stoichiometric condition) or a rich state in which the fuel amount is more than the theoretical air fuel ratio.

Figure 1:
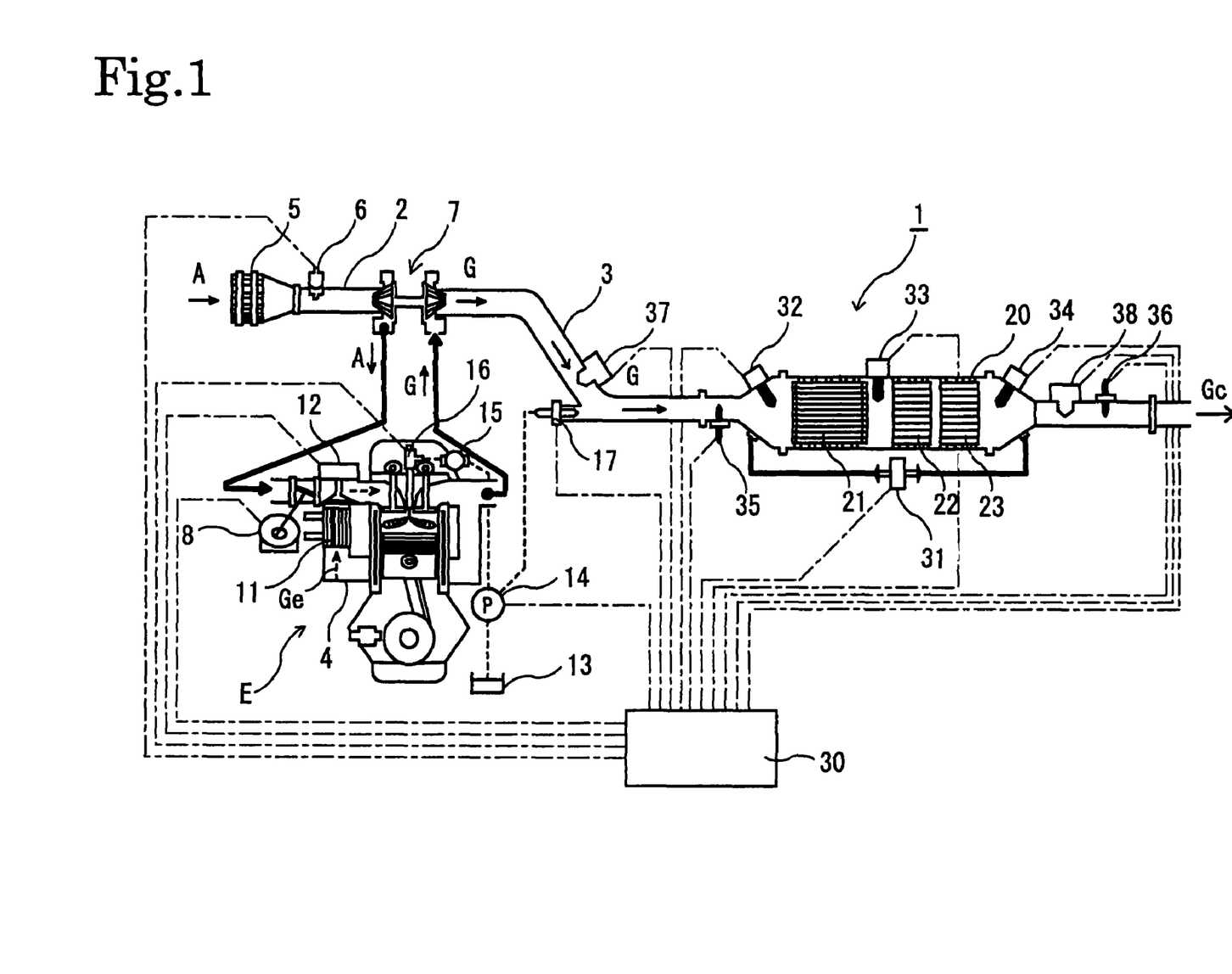
FIG. 1 is a drawing showing the entire configuration of the exhaust gas purification system in a first embodiment affecting the present invention.

A first embodiment of the present invention is explained. The configuration of an exhaust gas purification system in this first embodiment is shown in FIG. 1. In this exhaust gas purification system 1, an exhaust gas purification apparatus 20 is arranged in an exhaust passage 3 of an engine (internal combustion engine) E.

This exhaust gas purification apparatus 20 is configured by having a catalyst carrying DPF apparatus 21 that carries a NOx occlusion reduction type catalyst, a NOx occlusion reduction type catalyst apparatus 22, and a catalyst apparatus 23 that carries an oxidizing catalyst or a three-dimensional catalyst.

The catalyst carrying DPF 21 is configured carrying the NOx occlusion reduction type catalyst consisting of a catalyst metal and a NOx occlusion material (a NOx occlusion substance) in a part of a monolithic honeycomb type wall flow type filter. This filter is configured by alternatively sealing an entrance and an exit of a channel of the honeycomb of a porous ceramic. Platinum, palladium, etc. are used as a catalyst metal, and barium, etc. are used as the NOx occlusion material.

In this catalyst carrying DPF 21, PM (particulate matter) in the exhaust gas is collected at a porous ceramic wall. Along with that, the NOx occlusion material occludes NOx in the exhaust gas at the lean state of the air fuel ratio of the exhaust gas in which the oxygen concentration is high with the carried NOx occlusion reduction type catalyst. Further, at the rich state of the air fuel ratio of the exhaust gas in which the oxygen concentration is low or zero, the occluded NOx is discharged and the discharged NOx is reduced with a catalytic action of the catalyst metal. With this, NOx is prevented from flowing out into the atmosphere.

The NOx occlusion reduction type catalyst apparatus 22 is configured by providing a catalyst coating layer of aluminum oxide, titanium oxide, etc. in a monolithic catalyst, and by carrying a NOx occlusion reduction type catalyst in this catalyst coating layer. This monolithic catalyst is formed with cordierite, silicon carbide, a very thin plate stainless steel, etc. A carrier of a structural material of this monolithic catalyst has a large number of cells, the catalyst coating layer provided on the inner wall of this cell has a large surface area, and a contact efficiency with the exhaust gas is promoted.

This NOx occlusion reduction type catalyst apparatus 22 purifies NOx that was not purified in the catalyst carrying DPF 21. Especially, this apparatus 22 accomplishes a large role of purifying NOx that is discharged from the catalyst surface of the catalyst carrying DPF 21 of which temperature is increased during PM regeneration of the catalyst carrying DPF 21 and preventing NOx from flowing out to the downstream side of the exhaust gas purification apparatus 20.

The catalyst apparatus 23 is formed by providing a catalyst coating layer on the surface of the honeycomb-shaped carrier and by carrying a three-dimensional catalyst, etc. in this catalyst coating layer. This carrier is formed with cordierite or heat resistance steel, and the catalyst coating layer is formed with active aluminum oxide, etc. Further, the three-dimensional catalyst is formed with an oxidizing catalyst, etc. consisting of a novel metal such as platinum, palladium, and rhodium. This catalyst apparatus 23 is to oxidize HC, CO, etc. flowing out from the NOx occlusion reduction type catalyst apparatus 22 and to make these components not be discharged into the atmosphere.

Further, an HC supplying valve (a fuel adding valve: a reducing agent supplying apparatus) 17 is provided in the exhaust passage 3 in the upstream side of the exhaust gas purification apparatus 20 in order to perform direct injection in the exhaust pipe in the air fuel ratio rich control. This HC supplying valve 17 supplies a fuel F such as light oil, including hydrocarbon (HC) that becomes a reducing agent of NOx. This HC supplying valve 17 is to make rich the air fuel ratio of the exhaust gas G flowing into the exhaust gas purification apparatus 20 by directly injecting the fuel (the reducing agent) F of the engine E whose pressure is increased with a pump 14 from a fuel tank 13 into the exhaust passage 3, and it becomes a means for the air fuel ratio rich control by the direct injection in the exhaust pipe.

Then, in this first embodiment, this HC supplying valve 17 is formed with a fuel adding valve of relatively large capacity that can change the fuel injection amount in a short time with a duty control, etc.

Then, an air cleaner apparatus 5, a mass air flow sensor (MAF sensor) 6 that measures the air intake amount, a compressor of a turbocharger 7, and an air intake aperture valve (an air intake throttle valve) 8 for adjusting the amount of air intake, are arranged in an air intake passage 2. Further, the fuel adding valve 17 of the reducing agent supplying apparatus is arranged in the exhaust passage 3 in the upstream side of the exhaust gas purification apparatus 20, and an EGR cooler 11 and the EGR valve 12 that adjusts an EGR amount are arranged in an EGR passage 4.

Further, a differential pressure sensor 31 is provided in a conductive pipe connecting the upstream side and the downstream side of the exhaust gas purification apparatus 20 in order to monitor the state of clogging of the catalyst carrying DPF apparatus 21. Further, in order to detect the temperature of the exhaust gas, a first temperature sensor 32 is arranged in the upstream side of the catalyst carrying DPF apparatus 21, a second temperature sensor 33 is arranged in the downstream side of the catalyst carrying DPF apparatus 21, and a third temperature sensor 34 is arranged in the downstream side of the catalyst apparatus 23.

Further, for the air fuel ratio control, a first oxygen concentration sensor 35 is arranged in the upstream side of the exhaust gas purification apparatus 20, and a second oxygen concentration sensor 36 is arranged in the downstream side of the exhaust gas purification apparatus 20. Furthermore, in order to detect the NOx purification ratio, a first NOx concentration sensor 37 is arranged in the upstream side of the exhaust gas purification apparatus 20, and a second NOx concentration sensor 38 is arranged in the downstream side.

Then, a control unit (ECU: Engine Control Unit) 30 is provided that performs a general control of the operation of the engine E, a PM regeneration control, a NOx regeneration control, and a sulfur purge control. In this PM regeneration control, PM deposited in the catalyst carrying DPF apparatus 21 is combusted and removed. In the NOx regeneration control, a NOx purification capability of the NOx occlusion reduction type catalyst apparatus 22 is recovered. In the sulfur purge control, the NOx occlusion reduction type catalyst apparatus 22 is recovered from sulfur poisoning.

Detected values from the differential pressure sensor 31, first to third temperature sensors 32, 33, and 34, first and second oxygen concentration sensors 35 and 36, first and second NOx concentration sensors 37 and 38, etc. are input into this control unit 30. Signals that control the intake air throttle 8, the EGR valve 12, the fuel injection valve 16 of a common rail electronic control fuel injection apparatus for fuel injection connected to a common rail 15, etc. are output from this control unit 30.

In this NOx purification system 1, air A passes an air cleaner apparatus 5 in the intake air passage 2 and the mass air flow sensor 6. After that, the air A is compressed and its pressure is increased by a compressor of a turbocharger 7. After that, the amount of the air A is adjusted by the intake air throttle 8 and the air A enters into a cylinder from an intake air manifold. Then, exhaust gas G generated in the cylinder exits from an exhaust manifold to the exhaust passage 3, and drives a turbine of the turbo charger 7. After that, the exhaust gas G passes an exhaust gas purification apparatus 20 and is purified to become exhaust gas Gc, and the exhaust gas Gc is exhausted into the atmosphere through a muffler that is not shown in the figures. Further, a part of the exhaust gas G passes an EGR cooler 11 in the EGR passage 4 as EGR gas Ge, its amount is adjusted with the EGR valve 12 and EGR gas Ge is re-circulated to the intake air manifold.

In the exhaust gas purification system 1 equipped with the catalyst carrying DPF 21 carrying a NOx occlusion reduction type catalyst and the NOx occlusion reduction type catalyst apparatus 22, by performing NOx regeneration control with a catalyst regeneration control means incorporated into the control unit 30 of the engine E when the NOx occlusion estimated accumulation amount becomes a prescribed limitation amount (a determination amount) related to the NOx occlusion saturation amount, the exhaust gas G is made to be an air fuel ratio rich state, and the absorbed NOx is discharged. This discharged NOx is reduced with a noble metal catalyst. With this regeneration control, NOx occlusion capability is recovered.

Then, in the present invention, by performing a control of changing the injection amount of the HC supplying valve 17 with a duty control, etc. during NOx regeneration of the NOx occlusion reduction type catalyst in the exhaust gas purification apparatus 20, the concentration of the reducing agent in the exhaust gas flowing into the exhaust gas purification apparatus 20 is changed with time corresponding to a temporal change of the regeneration mechanism. With this, it is rapidly made to a high concentration in a prescribed range at the beginning of the regeneration, and after that, to a low concentration in a prescribed range. After this low concentration is kept during the prescribed time determined in advance or until the completion time obtained from surveillance of the NOx regeneration state, the HC supplying valve 17 is closed, and the supply of the reducing agent into the exhaust gas is ended.

More specifically, as shown in FIG. 3, in a period of the NOx regeneration control of 2 s (sec) to 5 s per one time, it is made to be the highest concentration λmax of 0.70 to 0.80 in excess air ratio conversion during T1 of 0.01 s to 0.50 s for example, and this highest concentration λmax and a high concentration of 0.70 to 0.90 (more preferable range is 0.75 to 0.85) in excess air ratio conversion are kept for T2 of 0.10 s to 2.5 s. After that, a low concentration of 0.80 to 1.00 (more preferable range is 0.90 to 1.00) in excess air ratio conversion is kept for T3 of 0.20 s to about 4.0 s, and then the supply of the reducing agent is stopped.

Or, in the ratio with the regeneration control period, the highest concentration is made during the period T1 that is 1% to 5% of the regeneration control period. Further, the high concentration maintaining period T2 is made to be 20% to 40% of the regeneration control period, the low concentration maintaining period T3 is made to be 40% to 60% of the regeneration control period, and a period T4 of returning from the low concentration to a lean state is made to be the remainder (15% to 40%) of the regeneration control period. Further, the high concentration is made to be 0.70 to 0.90 (more preferable range is 0.75 to 0.85) in excess air ratio conversion, and the low concentration is made to be 0.80 to 1.00 (more preferable range is 0.90 to 1.00) in excess air ratio conversion.

The control data of the HC supplying valve 17 corresponding to each of the control periods and the concentration of the reducing agent are memorized in the control unit 30 as map data. This map data are obtained with an experiment, a simulation calculation, etc. in advance. By referring to these map data in the NOx regeneration control, the control that realizes each of the control period and the concentration of the reducing agent can be easily realized.

That is, in the case of the NOx regeneration of the NOx occlusion reduction type catalyst in the exhaust gas purification apparatus 20, because the discharging amount of the NOx is large at the beginning of the regeneration at the air fuel ratio rich control of the NOx regeneration, it is necessary to rapidly reduce this discharged NOx. Because of that, it is rapidly made to be a high concentration at the beginning of the regeneration. Further, after that, because the NOx discharged amount becomes small and becomes about a constant amount, it is made to be a low concentration. With this NOx regeneration control, the reducing agent is supplied at an appropriate amount, and the concentration of the reducing agent is kept optimum from beginning to end. As a result, the purification capability can be recovered effectively, and flowing of the reducing agent to the downstream of the exhaust gas purification apparatus can be prevented.

Further, in the exhaust gas purification system 1 equipped with this catalyst carrying DPF apparatus 21, with the PM regeneration control means incorporated into the control unit 30 of the engine E, when the PM accumulation amount estimated by a differential pressure detected with the differential pressure sensor 31 becomes a prescribed limitation amount (a determination amount) related to the clogging amount of the DPF, the PM regeneration control is performed. In this PM regeneration control, the temperature of the exhaust gas flowing into the catalyst carrying DPF apparatus 21 is increased to the catalyst active temperature or more depending on necessity, and at the same time, the reducing agent is supplied and the temperature of the catalyst carrying DPF apparatus 21 is increased to the PM combustion initial temperature or more. With this increase of the temperature, the collected PM is combusted and removed, and the PM collection capability is recovered.

Then, in the present invention, a control to change the injection amount of the HC supplying valve 17 with a duty control is performed during PM regeneration of the exhaust gas purification apparatus 20. With this, the concentration of the reducing agent in the exhaust gas flowing into the exhaust gas purification apparatus 20 is changed with time corresponding to a temporal change of the regeneration mechanism. It is made to be a low concentration within the prescribed range at the beginning of the regeneration, and after that, a high concentration within the prescribed range, and a low concentration within the prescribed range just before the completion of the regeneration. After this, the HC supplying valve 17 is closed, and the supply of the reducing agent into the exhaust gas is ended.

Figure 5:
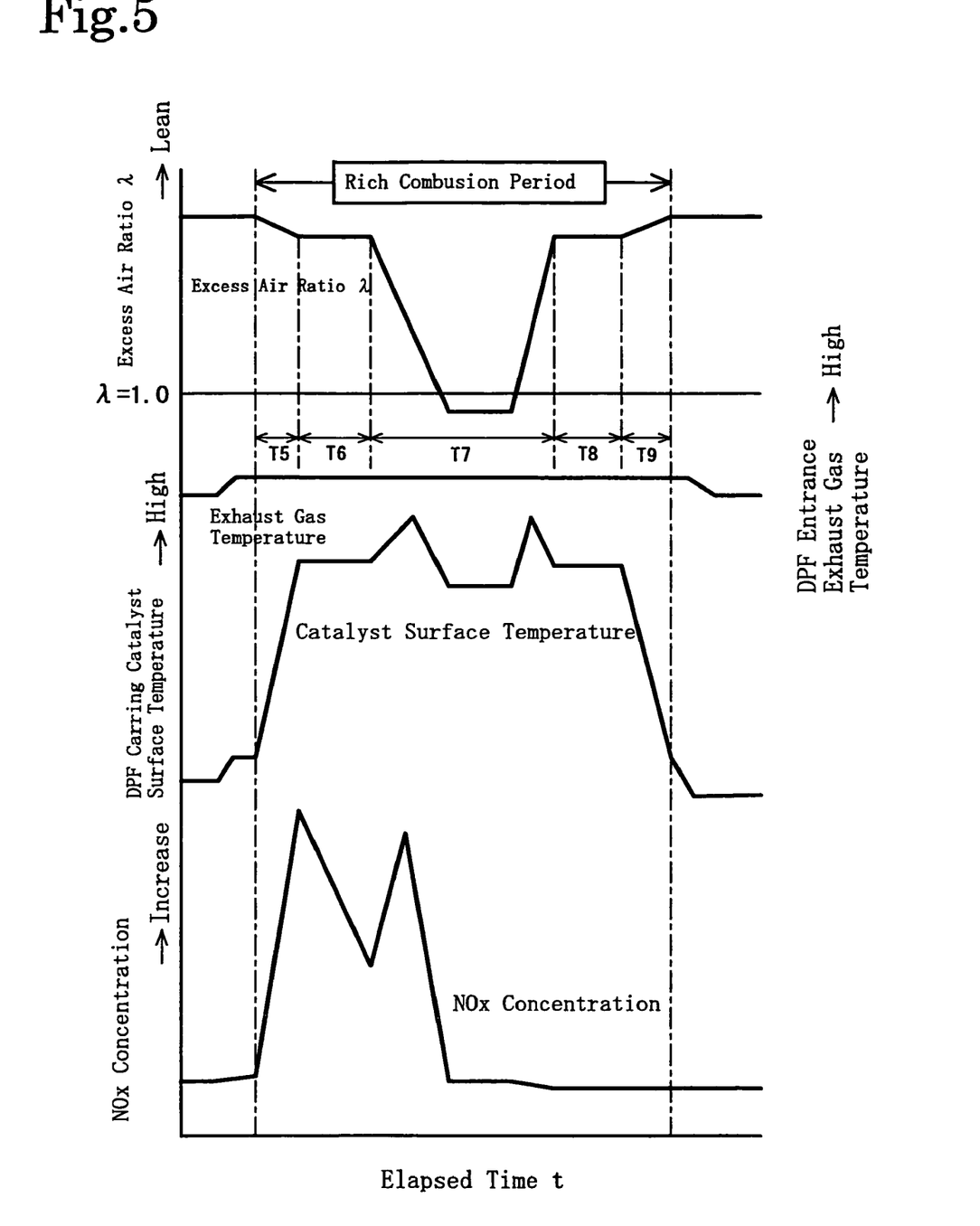
FIG. 5 is a drawing schematically showing a temporal change of excess air ratio flowing into the exhaust gas purification apparatus and the NOx concentration in the exhaust gas flowing out, the DPF carrying catalyst surface temperature, and the DPF entrance exhaust gas temperature during PM regeneration control according to the present invention.

More specifically, as shown in FIG. 5, in a period of the PM regeneration control of 10 s to 240 s per one time, it is made to be a low concentration of 1.5 to 5.0 in excess air ratio conversion during T5 of 1.0 s to 60.0 s for example, and this low concentration is kept for T6 of 3.0 s to 60.0 s. After that, a high concentration of 0.90 to 1.00 in excess air ratio conversion is kept for T7 of 3.0 s to 60.0 s. Furthermore, a low concentration of 1.50 to 5.0 in excess air ratio conversion is kept for T8 of 3.0 s to about 60.0 s, and then, the supply of the reducing agent is stopped.

Or, in the ratio with the regeneration control period, the low concentration is made during the period T5 that is 10% to 25% of the regeneration control period. Further, the low concentration maintaining period T6 is made to be 30% to 50% of the regeneration control period at the beginning of the regeneration, the high concentration maintaining period T7 is made to be 30% to 50% of the regeneration control period, and the low concentration maintaining period (T8+T9) just before the completion of regeneration is made to be the remainder (15% to 30%) of the regeneration control period.

This high concentration remaining period T6 is a value changing with the level of the PM combustion and removal. Because of that, this value T6 is preferably reset appropriately while monitoring the state of the PM combustion and removal, in other words, the recovery condition of clogging of the filter monitoring with the differential pressure sensor 31.

Further, the low concentration at the beginning of the regeneration is made to be 1.5 to 5.0 in excess air ratio conversion, the high concentration in the middle is made to be 0.90 to 1.00 in excess air ratio conversion, and the low concentration just before the completion of the regeneration is made to be 1.5 to 5.0 in excess air ratio conversion.

Each of these control periods and the control data of the HC supplying valve 17 corresponding to the concentration of the reducing agent are memorized in the control unit 30 as map data. This map data are obtained with an experiment, a simulation calculation, etc. By referring to these map data in the NOx regeneration control, the control that realizes each control period and the concentration of the reducing agent can be easily realized.

That is, in the case of the PM regeneration of the catalyst carrying DPF apparatus 21 in the exhaust gas purification apparatus 20, at the exhaust gas temperature increase control in the PM regeneration, it is necessary to increase the surface temperature of the oxidization catalyst by supplying the reducing agent as a firing source at the beginning of the regeneration and reacting with an oxidization catalyst. Therefore, because some amount of oxygen is necessary to make the firing easy, the reducing agent is made to be a low concentration. After that, a large amount of $NO_2$ is discharged from the NOx catalyst in the catalyst carrying DPF apparatus 21 by increasing the temperature of the catalyst carrying DPF apparatus 21. Therefore, because it is necessary to reduce this $NO_2$ with the reducing agent, the supply of the reducing agent is increased and it is made to be a high concentration. Further, PM is combusted with the $NO_2$ discharged at this time. Furthermore, the amount of NOx discharged from the catalyst carrying DPF apparatus decreases. Because of that, because it is necessary to decrease the reducing agent in the exhaust gas, the reducing agent is made to be a low concentration.

With this PM regeneration control, the reducing agent is supplied at an appropriate amount, and the concentration of the reducing agent is kept optimum from beginning to end. With this, the purification capability can be recovered effectively, and flowing out of the reducing agent to the downstream side of the exhaust gas purification apparatus can be prevented.

Figure 2:
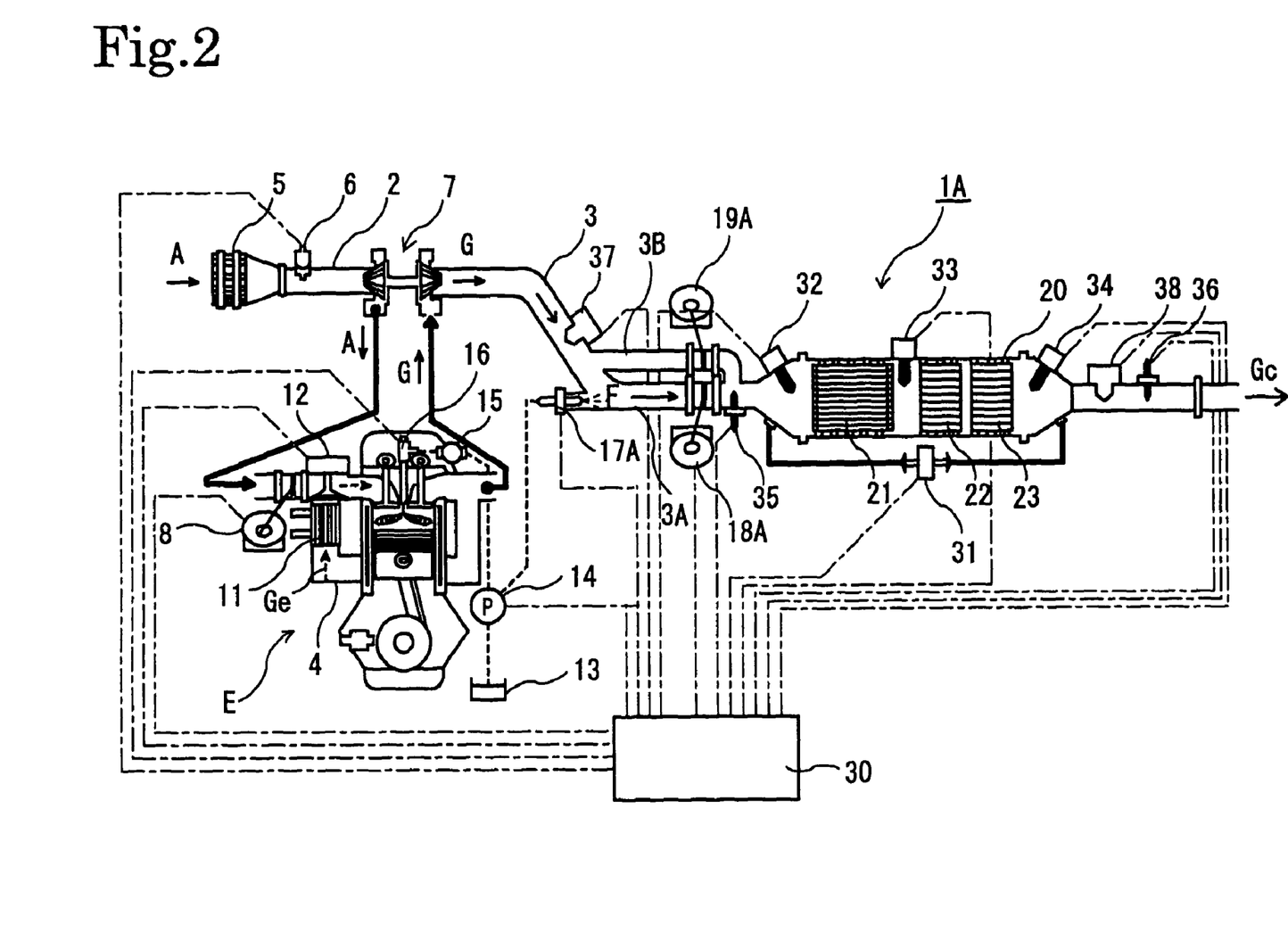
FIG. 2 is a drawing showing the entire configuration of the exhaust gas purification system in a second embodiment affecting the present invention.

Next, a second embodiment of the present invention is explained. The configuration of an exhaust gas purification system 1A in this second embodiment is shown in FIG. 2. This exhaust gas purification system 1A has almost the same system configuration as the exhaust gas purification system 1 in the first embodiment. However, the following points are different.

In the second embodiment, a first branched exhaust passage 3A and a second branched exhaust passage 3B are provided by branching the exhaust passage 3 in the upstream side of the exhaust gas purification apparatus 20 and are merged in the upstream side of the exhaust gas purification apparatus 20. The HC supplying valve (fuel adding valve: the reducing agent supplying apparatus) 17A is provided in this first branched exhaust passage 3A.

This HC supplying valve 17A in the second embodiment is not necessarily formed with a fuel adding valve having relatively large capacity in which the fuel injection amount can be changed in a short time with the duty control, etc. as the HC supplying valve 17 in the first embodiment, and it may be formed with a fuel adding valve that performs injection of constant amount or a fuel adding valve with poor response.

Further, a first open and close valve (flow path control means) 18A that controls flow of the exhaust gas in this first branched exhaust passage 3A is provided, and a second open and close valve (flow path control means) 19A that controls flow of the exhaust gas in the second branched exhaust passage 3B is provided. Moreover, the number of valves can be decreased when a switching valve (flow path control means: not shown in the Figures) such as a three-way valve, etc., that switches the first branched exhaust passage 3A and the second branched exhaust passage 3B instead of the first open and close valve 18A and the second open and close valve 19A.

In the exhaust gas purification system 1A in this second embodiment, during NOx regeneration of the NOx occlusion reduction type catalyst in the exhaust gas purification apparatus 20, the same as the exhaust gas purification system 1 in the first embodiment, the concentration of the reducing agent in the exhaust gas flowing into the exhaust gas purification apparatus 20 is changed with time corresponding to a temporal change of the regeneration mechanism, that is corresponding to a temporal change of the condition of the exhaust gas purification apparatus 20, it is rapidly made to a high concentration at the beginning of the regeneration, and after that, to a low concentration.

Provided that, an open and close control of the HC supplying valve 17A and an open and close control of the first open and close valve 18A and the second open and close valve 19A are combined and performed as follows, not changing the injection amount of the HC supplying valve 17 that is changed with time as in the first embodiment. Moreover, in the case that the HC supplying valve 17A can change the injection amount with a duty control etc., the change of the injection amount is used together.

During NOx regeneration in the exhaust gas purification apparatus 20, flow of the exhaust gas in the first branched exhaust passage 3A is stopped by closing the first open and close valve 18A, and at the same time, the exhaust gas is flowed by opening the second branched exhaust passage 3B by opening of the second open and close valve 19A. After closing this first open and close valve 18A, a direct injection of the reducing agent (fuel) F in the exhaust pipe is started by opening the HC supplying valve 17A. This direct injection in the exhaust pipe is performed for a prescribed time.

After that, the exhaust gas is flowed into the first branched exhaust passage 3A by opening the open and close valve 18A while continuing the direct injection in the exhaust pipe and keeping the supply of the reducing agent. At the same time, a control to stop the exhaust gas flow in the second branched exhaust passage 3B is performed by closing the open and close valve 19A.

While keeping this state, the direct injection in the exhaust pipe is performed during the time determined in advance or until the completion time obtained from surveillance of the NOx regeneration state. That is, the supply of the reducing agent is performed for a prescribed time.

After that, the direct injection in the exhaust pipe is stopped by closing the HC supplying valve 17A. With this stopping, the concentration of the reducing agent in the exhaust gas flowing into the exhaust gas purification apparatus 20 gradually decreases, and it returns the state before the NOx regeneration control.

The prescribed time of which the direct injection in the exhaust pipe after opening the open and close valve 19A is made to be the time in which an appropriate exhaust gas concentration distribution is obtained with an experiment, a calculation simulation, etc. in advance. This time is stored in control unit 30 includinq map data, etc. By referring to these map data in the NOx regeneration control, the concentration of the reducing agent in the exhaust gas in the first branched exhaust passage 3A when the first open and close valve 18A is shut can be made to be a high concentration within a prescribed range at the front tip side, and a low concentration within a prescribed range at the rear side.

As a result, by opening the first open and close valve 18A and flowing the exhaust gas having this prescribed concentration distribution into the exhaust gas purification apparatus 20, the same as the NOx regeneration control in the first embodiment, the concentration of the reducing agent in the exhaust gas flowing into the exhaust gas purification apparatus 20 can be made as follows at the supply of the reducing agent during NOx regeneration of the NOx occlusion reduction type catalyst. It is made to be a high concentration of 0.70 to 0.80 in excess air ratio conversion during 0.01 to 0.05 at the beginning of the regeneration, and a high concentration of 0.70 to 0.90 in excess air ratio conversion is kept for a prescribed time. After that, during the prescribed time, it is made to be a low concentration of 0.80 to 1.00 in excess air ratio conversion. After that, the supply of the reducing agent is stopped. Therefore, the change of the concentration with time, in which it is rapidly made to be a high concentration at the beginning of the regeneration, and after that, it is made to be a low concentration, can be created.

With this control, the concentration of the reducing agent in the exhaust gas flowing into the exhaust gas purification apparatus 20 can be corresponded to a temporal change of a mechanism of the regeneration at the NOx regeneration in the exhaust gas purification apparatus 20. Therefore, the NOx purification capability can be recovered effectively, and at the same time, flowing of the reducing agent F into the downstream side of the exhaust gas purification apparatus 20 can be prevented.

Moreover, the second embodiment also may have a configuration of which the second open and close valve 19A is not provided. In this case, the first branched exhaust passage 3A and the second branched exhaust passage 3B are provided so that a large part of the exhaust gas flows into the first branched exhaust passage 3A and not in the second exhaust passage 3B. This configuration can be easily formed by configuring the first branched exhaust passage 3A with the conventional exhaust passage 3, and forming the second branched exhaust passage 3B with a bypass passage branched from this exhaust passage 3.

In this case, during NOx regeneration in the exhaust gas purification apparatus 20, flow of the exhaust gas in the first branched exhaust passage 3A is stopped by closing the first open and close valve 18A, and the exhaust gas is flowed into the second branched exhaust passage 3B that is opened all the time. After closing this first open and close valve 18A, the direct injection of the reducing agent F in the exhaust pipe is started using the HC supplying valve 17A. This direct injection in the exhaust pipe is performed for a prescribed time.

After that, the exhaust gas of the first branched exhaust passage 3A is flowed by opening the first open and close valve 18A. At this time, the exhaust gas is flowed into also the second branched exhaust passage 3B that is opened all the time. However, because it is configured so that a large part of the exhaust gas flows into the first branched exhaust passage 3A, the concentration of the reducing agent in the exhaust gas flowing into the exhaust gas purification apparatus 20 rapidly becomes a high concentration at the beginning of the regeneration, and after that, becomes a low concentration.

The regeneration control method for an exhaust gas purification system and the exhaust gas purification system in the present invention having the said excellent effects can be used effectively as an exhaust gas purification system of many internal combustion engines such as an internal combustion engine loaded in an automobile, etc.

What is claimed is:

1. A regeneration control method for an exhaust gas purification system, comprising:
   providing an exhaust gas purification apparatus in an exhaust passage of an internal combustion engine;
   providing a reducing agent supplying apparatus in an upstream side of the exhaust gas purification apparatus;
   providing a control unit that controls a supply of the reducing agent from the reducing agent supplying apparatus into an exhaust gas flowing into the exhaust gas purification apparatus during regeneration control to recover purification capability of the exhaust gas purification apparatus;
   providing a first branched exhaust passage and a second branched exhaust passage by branching the exhaust passage in the upstream side of the exhaust gas purification apparatus and merging the first and second branched exhaust passages at a confluence in the upstream side of the exhaust gas purification apparatus;
   arranging the reducing agent supplying apparatus in the first branched exhaust passage, and at the same time; and
   providing a flow path controller in each of the first and second branched exhaust gas passages upstream of the confluence that controls a flow of the exhaust gas in the first or second branched exhaust passages,
   wherein the flow path controller in the first branched passage is located between the reducing agent supplying apparatus and the confluence,
   wherein, when the reducing agent is supplied at the time of regeneration, the respective flow path controllers control the flow of the exhaust gas in the first branched exhaust passage or in the second branched exhaust passage, so that a concentration of the reducing agent supplied to the exhaust gas purification apparatus is temporarily changed in response to a temporal change of the condition of the exhaust gas purification system at the time of regeneration.

2. An exhaust gas purification system, comprising:
   an exhaust gas purification apparatus in an exhaust passage of an internal combustion engine;
   a reducing agent supplying apparatus in an upstream side of the exhaust gas purification apparatus;
   a control unit that controls a supply of the reducing agent from the reducing agent supplying apparatus into an exhaust gas flowing into the exhaust gas purification apparatus during regeneration control to recover purification capability of the exhaust gas purification apparatus;
   a first branched exhaust passage and a second branched exhaust passage in the exhaust passage in the upstream side of the exhaust gas purification apparatus, which first and second branched exhaust passages merge at a confluence in the upstream side of the exhaust gas purification apparatus,
   wherein the reducing agent supplying apparatus is arranged in the first branched exhaust passage;
   a flow path controller provided in each of the first and second branched exhaust gas passages upstream of the confluence that controls a flow of the exhaust gas in the first or second branched exhaust passages,
   wherein the flow path controller in the first branched passage is between the reducing agent supplying apparatus and the confluence,
   wherein, when the reducing agent is supplied at the time of regeneration, the respective flow path controllers control the flow of the exhaust gas in the first branched exhaust passage or in the second branched exhaust passage, so that a concentration of the reducing agent supplied to the exhaust gas purification apparatus temporarily changed in response to a temporal change of the condition of the exhaust gas purification system at the time of regeneration.

3. The exhaust gas purification system as in claim 2, wherein the exhaust gas purification apparatus includes a catalyst carrying diesel particulate filter apparatus carrying a NOx occlusion reduction type catalyst, a NOx occlusion reduction type catalyst apparatus, and a catalyst apparatus carrying an oxidizing catalyst or a three dimensional catalyst from the upstream side.

4. The regeneration control method as in claim 1, wherein the flow of the exhaust gas in the first branched exhaust passage is stopped by the flow path controller, the reducing agent is supplied from the reducing agent supplying apparatus into the exhaust gas in the first branched exhaust passage, and then the exhaust gas in the first branched exhaust passage is allowed to flow by the flow path controller while maintaining the supply of the reducing agent, and at the same time, the flow of the exhaust gas in the second branched exhaust passage is stopped, and then the supply of the reducing agent is performed for a prescribed time and then stopped, during NOx regeneration of the NOx occlusion reduction type catalyst.

5. The exhaust gas purification system as in claim 2, wherein the control unit stops the flow of the exhaust gas in the first branched exhaust passage by the flow path controller at the supply of the reducing, the reducing agent is supplied from the reducing agent supplying apparatus into the exhaust gas in the first branched exhaust passage, and then the exhaust gas in the first branched exhaust passage is allowed to flow by the flow path controller while maintaining the supply of this reducing agent, and at the same time, the flow of the exhaust gas in the second branched exhaust passage is stopped, and then the supply of the reducing agent is performed for a prescribed time and then stopped agent, during NOx regeneration of the NOx occlusion reduction type catalyst.

6. The method as in claim 1, further comprising:
selecting the exhaust gas purification apparatus to include a catalyst carrying diesel particulate filter apparatus carrying a NOx occlusion reduction type catalyst, a NOx occlusion reduction type catalyst apparatus, and a catalyst apparatus carrying an oxidizing catalyst or a three dimensional catalyst from the upstream side.

* * * * *